(12) United States Patent
Su et al.

(10) Patent No.: US 12,050,310 B2
(45) Date of Patent: Jul. 30, 2024

(54) CONVEX INFINITY MIRROR DEVICES

(71) Applicant: WISTRON CORPORATION, New Taipei (TW)

(72) Inventors: Yi-Hsiang Su, New Taipei (TW); Chia Lin Kao, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 388 days.

(21) Appl. No.: 17/542,975

(22) Filed: Dec. 6, 2021

(65) Prior Publication Data
US 2023/0176349 A1    Jun. 8, 2023

(51) Int. Cl.
*G02B 17/02* (2006.01)
*G02B 17/06* (2006.01)
*A63J 5/02* (2006.01)

(52) U.S. Cl.
CPC ............ *G02B 17/026* (2013.01); *G02B 17/06* (2013.01)

(58) Field of Classification Search
CPC ........... A63J 5/02; A63J 15/00; G02B 17/026; G02B 17/06
USPC ............................................................ 472/63
See application file for complete search history.

(56) References Cited

U.S. PATENT DOCUMENTS

| | | | |
|---|---|---|---|
| 1,396,693 A | 11/1921 | Rugh | |
| 4,164,823 A | 8/1979 | Marsico | |
| 5,788,579 A * | 8/1998 | Cherry | F21S 10/00 |
| | | | 472/63 |
| 5,951,143 A | 9/1999 | Ginsberg | |
| 7,029,152 B1 * | 4/2006 | Kuhl | B60Q 3/14 |
| | | | 472/63 |
| 8,651,685 B2 | 2/2014 | Roberts et al. | |
| 2006/0102914 A1 | 5/2006 | Smits et al. | |

FOREIGN PATENT DOCUMENTS

| | | |
|---|---|---|
| CN | 203686735 U | 7/2014 |
| CN | 211010879 U | 7/2020 |
| GB | 2586280 A | 8/2019 |
| JP | 2006303122 A | 11/2006 |
| KR | 1020070104029 | 10/2007 |
| KR | 10-2013-0018782 | 2/2013 |

OTHER PUBLICATIONS

Anonymous: "How Infinity Mirrors Work—With Experiments: 13 Steps—Instructables," pp. 1-7, retrieved from the Internet: URL: https://web.archive.org/web/20210729165542/https://www.instructables.com/How-Infinity-Mirrors-Work-With-Experiments (2021).
Extended EP Search Report to corresponding EP Application No. 22156391.9 mailed Jul. 22, 2022, 9 pages (2022).

* cited by examiner

*Primary Examiner* — Kien T Nguyen
(74) *Attorney, Agent, or Firm* — Peigen Jiang; Greenberg Traurig, LLP

(57) ABSTRACT

An infinity mirror device has a first mirror having a convex first reflective surface, a partially transparent second mirror having a second reflective surface facing the first reflective surface wherein the first and second mirror are spaced apart by a predetermined distance, and a light source disposed in a space between the first and the second mirror.

20 Claims, 13 Drawing Sheets

R = 400 mm

R = 600 mm

R = 800 mm

R = 1000 mm

R = 1200 mm

CONVEX INFINITY MIRROR DEVICES

BACKGROUND

The present disclosure relates generally to devices for creating infinity mirror display effects, and, more particularly, to an infinity mirror lighting module with a convex mirror and methods for its manufacturing.

The infinity mirror effect is commonly observed in rooms having mirrors on oppositely facing walls. The mirrors show images of the same object repeated apparently endlessly, but with each new image somewhat smaller and appearing farther away. One arrangement is to place a partially transparent mirror in front of a fully reflecting mirror and placing an object or a light source between the mirrors. A drawback, however, in conventional infinity mirror devices, object or light source images tend to be compressed in a narrow region when viewing from an angle perpendicular to the surface of the mirrors. As such, what is desired is infinity mirror device that creates well separated and realistic images of an object or a light source when viewed from a wide range of angles.

SUMMARY

The present disclosure provides an infinity mirror device that has a first mirror having a convex first reflective surface, a partially transparent second mirror having a second reflective surface facing the first reflective surface wherein the first and second mirror are spaced apart by a predetermined distance, and a light source disposed in a space between the first and the second mirror.

In an embodiment, the first reflective surface has a Fresnel lens structure, and the second reflective surface is either flat or convex.

In an embodiment, the infinity mirror device of the present disclosure further includes a light source disposed in a space between the first and the second mirror at a periphery of either the first or the second mirror. The light source exemplarily includes a plurality of LED light emitters mounted on a printed circuit board with a dispersion lens disposed in front of the plurality of LED light emitters.

In an embodiment, the infinity mirror device of the present disclosure further includes a reflective member disposed in the vicinity of the light source for reflecting light generated by the light source toward a center of a space between the first and the second mirror.

Figure 1A:
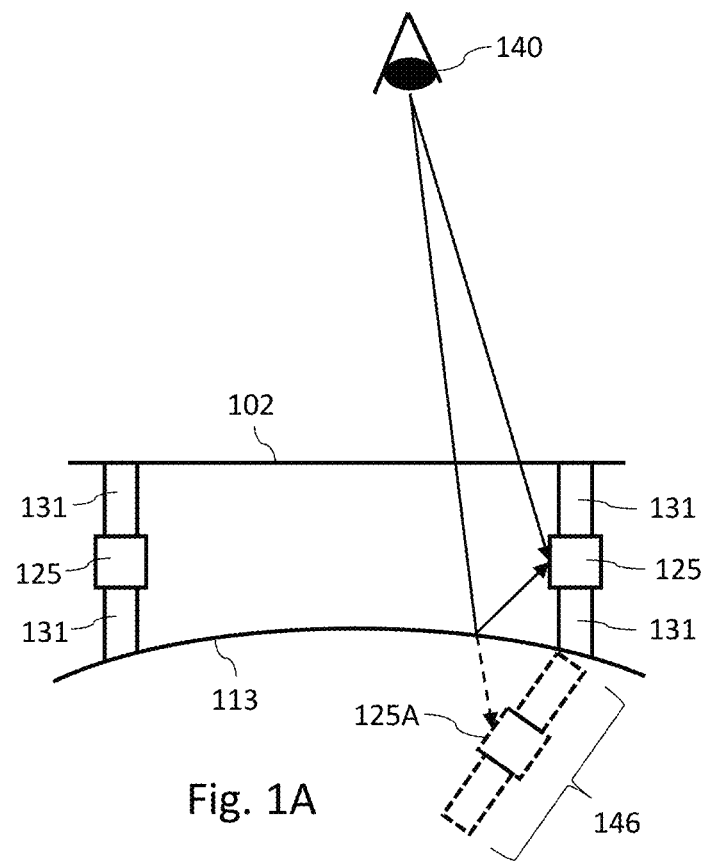
FIGS. 1A and 1B illustrate an infinity mirror lighting device with a convex mirror according an embodiment of the present disclosure.

The drawings accompanying and forming part of this specification are included to depict certain aspects of the disclosure. A clearer conception of the disclosure, and of the components and operation of systems provided with the disclosure, will become more readily apparent by referring to the exemplary, and therefore non-limiting, embodiments illustrated in the drawings, wherein like reference numbers (if they occur in more than one view) designate the same elements. The disclosure may be better understood by reference to one or more of these drawings in combination with the description presented herein.

DESCRIPTION

The present disclosure relates to an infinity mirror display device. Preferred embodiments of the present disclosure will be described hereinafter with reference to the attached drawings.

Figure 1B:
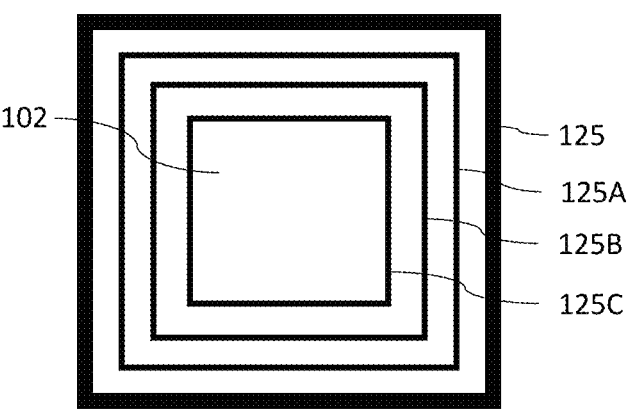

FIGS. 1A and 1B, which are a side and a top view, respectively, of an infinity mirror lighting device with a convex mirror according an embodiment of the present disclosure. Referring to FIG. 1A, the infinity mirror lighting device includes a partially transparent front mirror 102, a convex bottom mirror 113, a light source 125 and a frame 131 for securing the mirrors 102 and 113 and the light source 125. The front mirror 102 and the convex bottom mirror 113 each has a reflective surface facing each other, so that a light beam from the light source 125 bounces back and forth between the two mirrors 102 and 113 many times until it becomes too dim to be visible. When an eye 140 views the infinite mirror lighting device from an angle perpendicular to the front mirror 102, it sees a reflection 146 including that of a light source 125A tilted away from a straight extension of the real object (131 and 125) due to the convex nature of the bottom mirror 113.

Referring to FIG. 1B, when the infinity mirror lighting device shown in FIG. 1A is viewed from straight above the front mirror 102, the square light source 125 creates first order reflected image 125A, second order reflected image 125B and third reflected image 125C, etc. The light source 125 and the reflected images 125A, 125B and 125C are far apart from each other due to the convex mirror 113.

In one embodiment, the front mirror 102's reflective surface is flat as shown in FIG. 1. In another embodiment, the partially transparent front mirror 102 also has a convex reflective surface (not shown) similar to the convex bottom mirror 113. The two convex reflective surfaces face each other so that the reflected image separation effect is augmented.

Figure 2A:
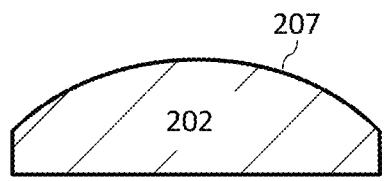
FIGS. 2A-2C illustrate a cross-section of a spherical convex mirror and its effect in an infinity mirror light device.
Figure 2B:
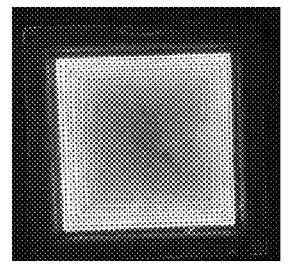
Figure 2C:
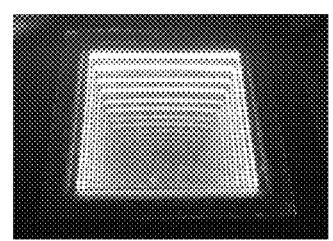

FIGS. 2A-2C illustrate a cross-section of a spherical convex mirror 202 and its effect in an infinity mirror light device. Referring to FIG. 2A, the spherical convex mirror 202 has a rounded outward surface 207 like the exterior of a sphere or circle in a cross-sectional view. The surface 207 is reflective.

FIG. 2B is a top view of an infinity mirror lighting device using the spherical convex mirror 202 as a bottom mirror. A linear light source placed on four edges of the lighting device. Reflected images of the light source are well separated in the top view shown in FIG. 2B.

FIG. 2C is an angled view of the infinity mirror lighting device shown in FIG. 2B. The separation of the reflected images is more pronounced in the angled view than in the top view. However, the reflected images show some degrees of bending due to the curved surface 207 of the spherical convex mirror 202.

Figure 3A:
FIGS. 3A-3C illustrate a cross-section of a pyramid convex mirror and its effect in an infinity mirror light device.
Figure 3B:
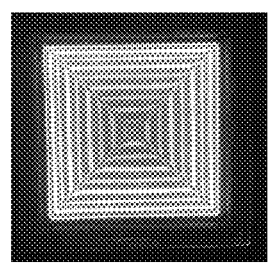
Figure 3C:
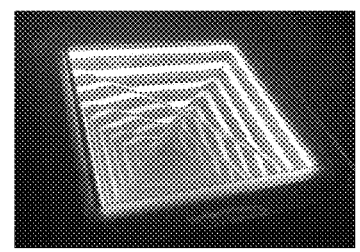

FIGS. 3A-3C illustrate a cross-section of a pyramid convex mirror 303 and its effect in an infinity mirror light device. Referring to FIG. 3A, the pyramid convex mirror 303 has a slanted outward surface 307 like the exterior of a pyramid or a triangle in a cross-sectional view. The surface 307 is totally reflective.

FIG. 3B is a top view of an infinity mirror lighting device using the pyramid convex mirror 303 as a bottom mirror. A linear light source placed on four edges of the lighting device. Reflected images of the light source are well separated in the top view shown in FIG. 3B.

FIG. 3C is an angled view of the infinity mirror lighting device shown in FIG. 2B. The separation of the reflected images is more pronounced in the angled view than in the top view. However, the reflected images show distortions due to the discontinuity or corners of the surface 307 of the pyramid convex mirror 303.

Figure 4:
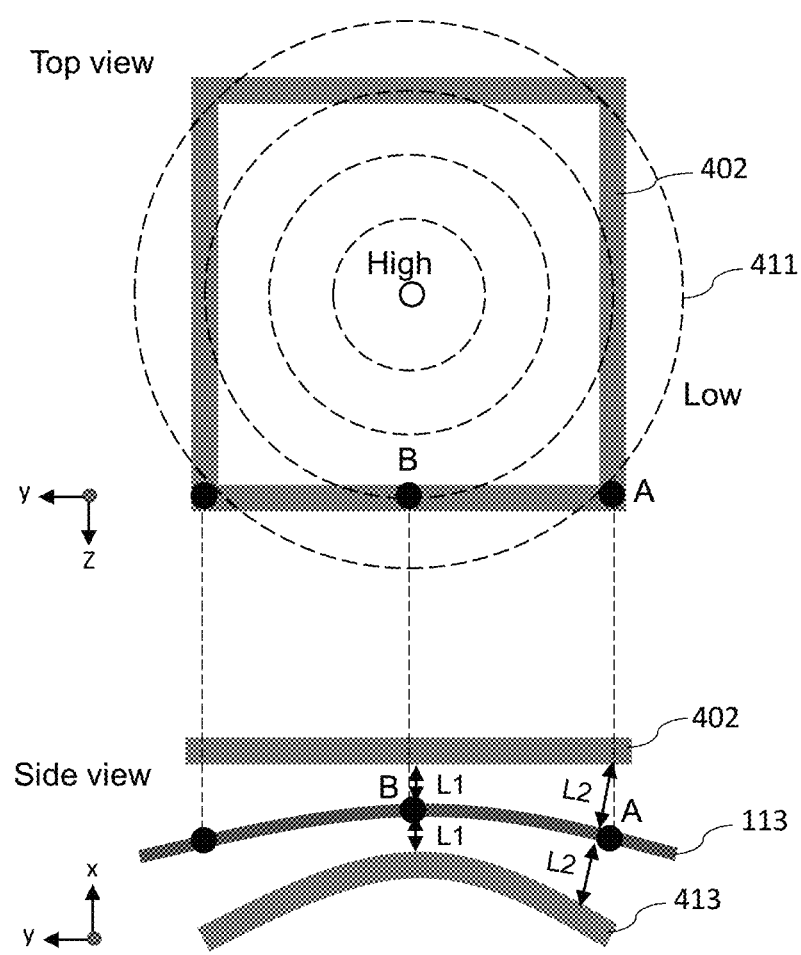
FIG. 4 illustrates how a convex bottom mirror creates bent images.

FIG. 4 illustrates how a convex bottom mirror creates bent images. In a top view, a liner light source 402 form a square with straight edges. Dotted lines 411 represent a contour map of the convex bottom mirror 113 shown in FIG. 1A. Surface of the convex bottom mirror 113 is high in the center and low at the edge. Therefore, point A is lower than point B on the surface of convex bottom mirror 113.

Referring to a side view of FIG. 4, a distance L1 between the light source 402 and the surface of the convex bottom mirror 113 at point B is smaller than a distance L2 between the light source 402 and the surface of the convex bottom mirror 113 at point A. Therefore, a reflected image 413 of the light source 402 is bent due to the distance differences. The separation of reflected images is desired, but the bending is not.

Figure 5:
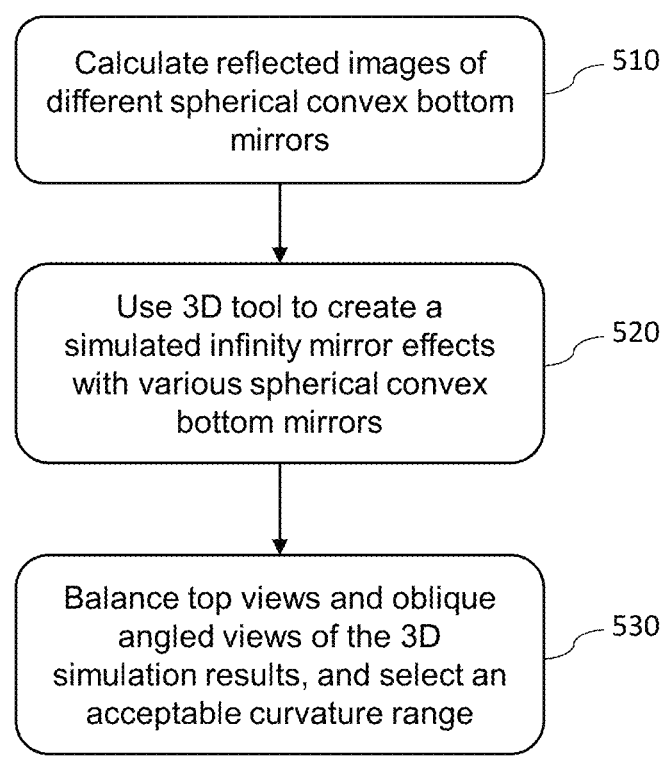
FIG. 5 is flow-chart illustrating a process for selecting an acceptable curvature range for the convex bottom mirror.

FIG. 5 is flow-chart illustrating a process for selecting an acceptable curvature range for the convex bottom mirror. In block 510, the process calculates reflected images of different spherical convex bottom mirrors. In block 520, the process uses 3D tools to create a simulated infinite mirror effects with various spherical convex bottom mirrors. In block 530, the process balances top views and oblique angled views of the 3D simulation results and selects an acceptable curvature range for the spherical convex bottom mirror, so that the reflected images are separated enough yet maintain an acceptable bending.

Figure 6A:
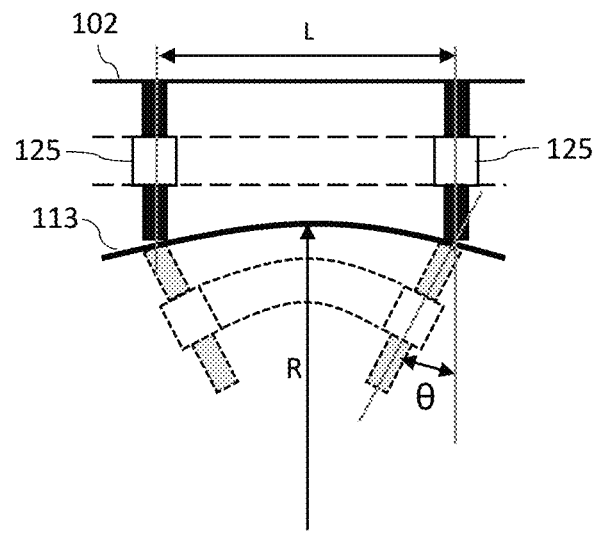
FIGS. 6A and 6B illustrate a calculation of an inward angle of a reflected image.
Figure 6B:
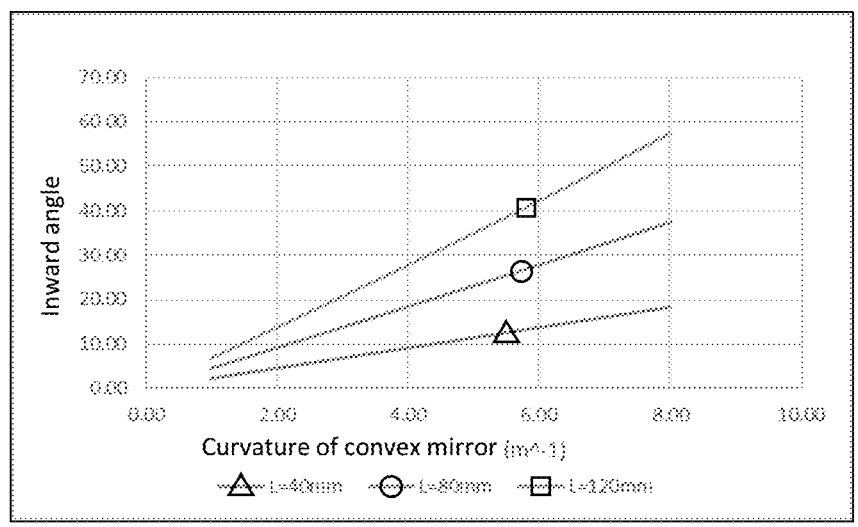

FIGS. 6A and 6B illustrate a calculation of an inward angle of a reflected image. Referring to FIG. 6A, an inward angle θ of a first order reflected image is calculated by following equation:

$$\theta \approx 2 \cdot \sin^{-1}\left(\frac{L}{2R}\right) \quad \text{Equation (1)}$$

where θ is an inward angle, L is a distance between two edges of the light source 125, and R is a radius of the convex bottom mirror 113.

When L is set at 40 mm, 80 mm or 120 mm, the inward angle θ is plotted against a curvature of the convex mirror as shown in FIG. 6B. The curvature is defined as 1/R. For a given L, the higher the curvature of the convex mirror is, the higher the inward angle θ becomes.

Figure 7A:
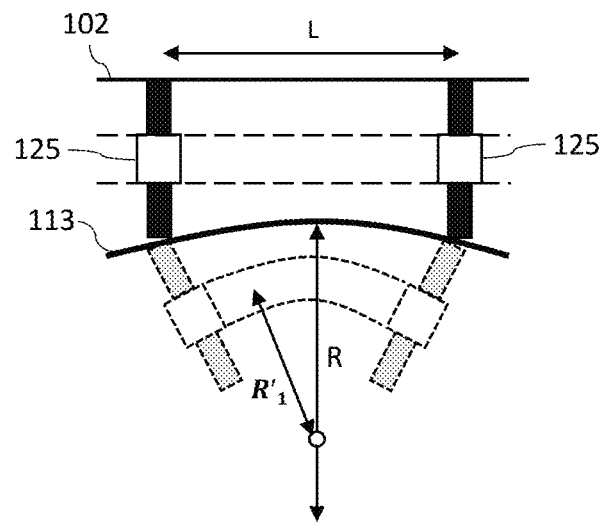
FIGS. 7A and 7B illustrate a calculation of curvature of a first-order reflected image.
Figure 7B:
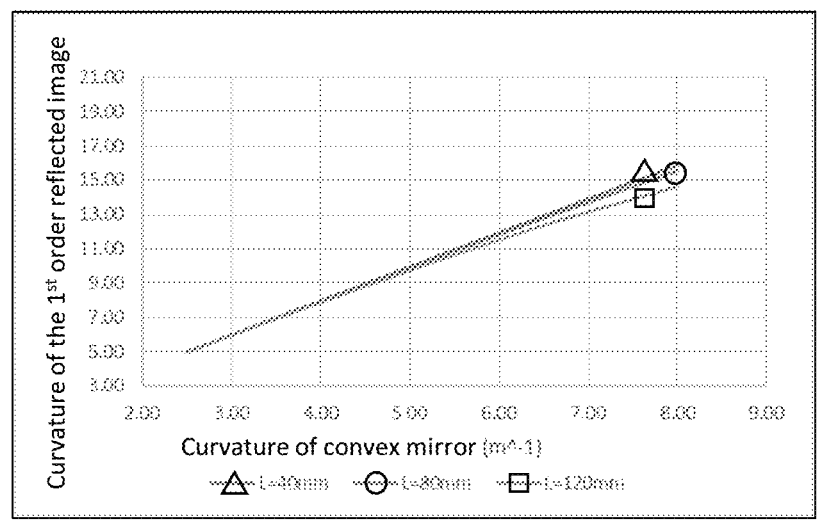

FIGS. 7A and 7B illustrate a calculation of curvature of a first-order reflected image. Referring to FIG. 7A, a radius R'1 of the first-order reflected image can be expressed as:

$$R'_1 \approx \frac{L^2}{8h} + \frac{h}{2} \text{ where } h = 2 \cdot \left(\sqrt{R^2 - L^2/4} - \sqrt{R^2 - L^2/2}\right), \quad \text{Equation (2)}$$

R is the radius of the convex bottom mirror 113, and L is the distance between two edges of the light source 125.

FIG. 7B is a plot of curvature of the 1st order reflected image (1/R'1) against curvature of the convex mirror (1/R). The plot shows that the higher the curvature of the convex mirror is, the higher the curvature of the 1st order reflected image becomes. Note that the distance L between two edges of the light source 125 does not make much difference to the plot.

Figure 8A:
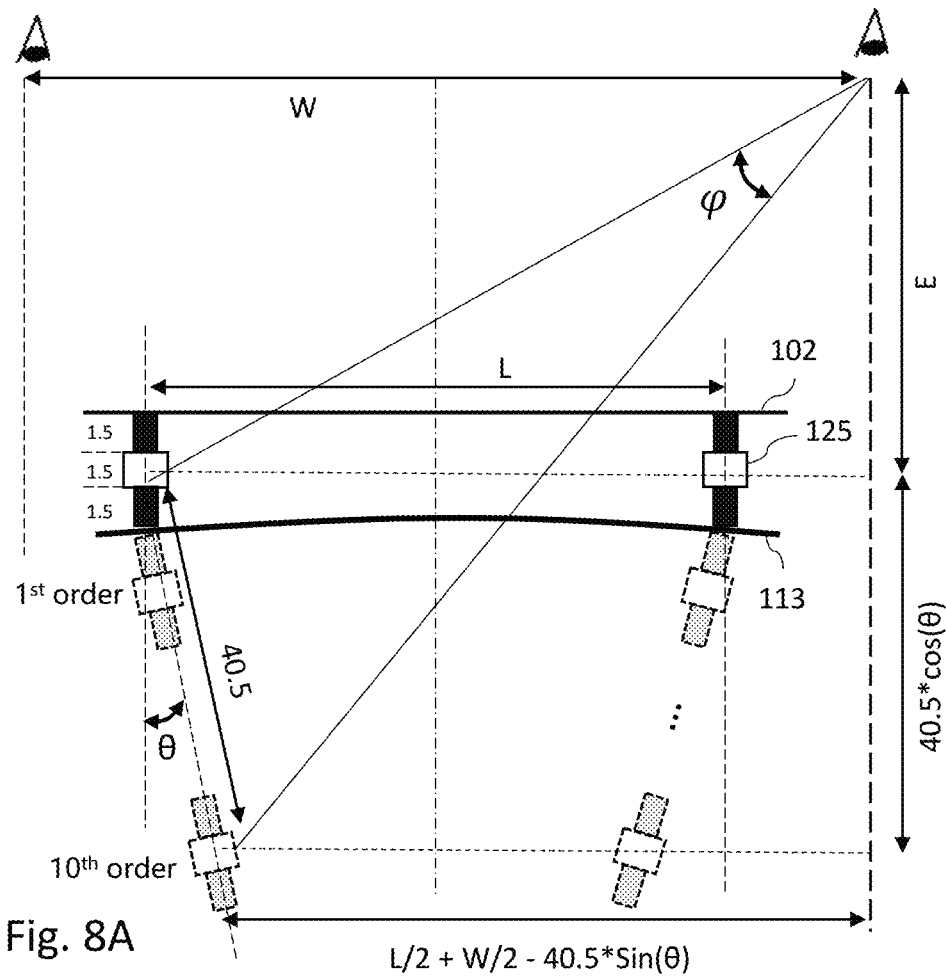
FIGS. 8A and 8B illustrate a calculation of a viewing angle difference between the light source and a $10^{th}$ order reflected image.
Figure 8B:
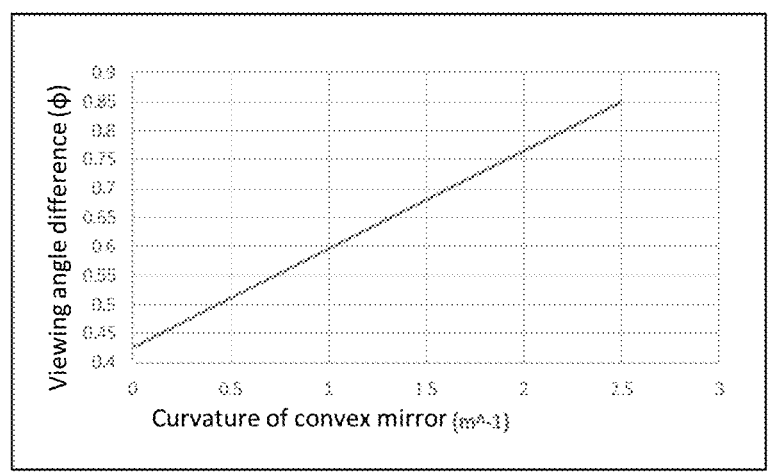

FIGS. 8A and 8B illustrate a calculation of a viewing angle difference q between the light source 125 and a 10th order reflected image. The higher the viewing angle difference q is, the more separation between two neighboring reflected images is. In other words, higher q means that the reflected images are more tilted inwardly. The viewing angle difference q can be calculated by following equation.

$$\varphi \approx \tan^{-1}\left(\frac{L}{2E}\right) - \tan^{-1}\left(\frac{\frac{L}{2} + \frac{W}{2} - 40.5 * \sin\theta}{E + 40.5 * \cos\theta}\right) \quad \text{Equation (3)}$$

where θ is calculated from Equation (1); R is the radius of the convex bottom mirror 113; L is the distance between two edges of the light source 125; E is a distance between a viewing eye and the light source 125 (50 mm); and W is distance between two eyes (60 mm).

FIG. 8B is a plot of the viewing angle difference against the curvature of the convex mirror. The higher the curvature is, the larger the viewing angle difference q is. For human eyes to percept a separation between neighboring reflected images, the above viewing angle difference q must be larger than 0.6 degree.

Figure 9A:
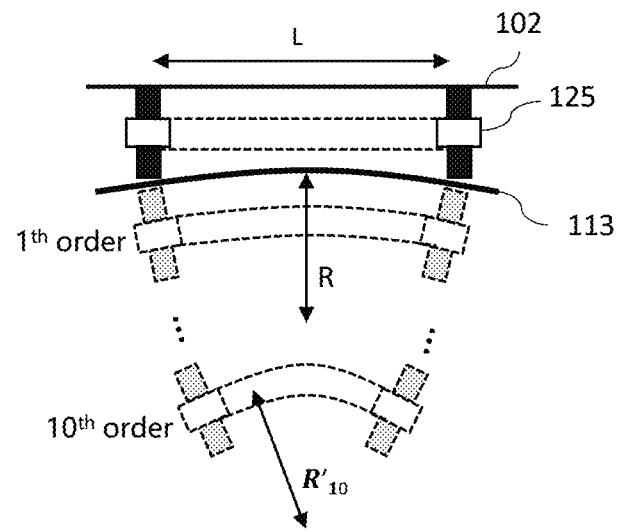
FIGS. 9A-9C illustrate a way to determine an acceptable range of bending for the reflected images.
Figure 9B:
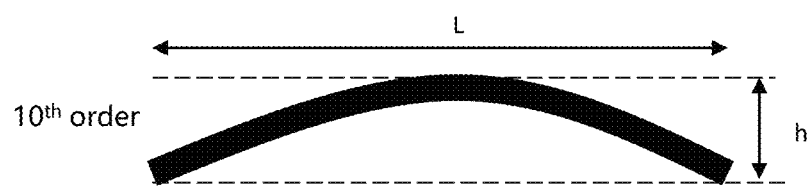
Figure 9C:
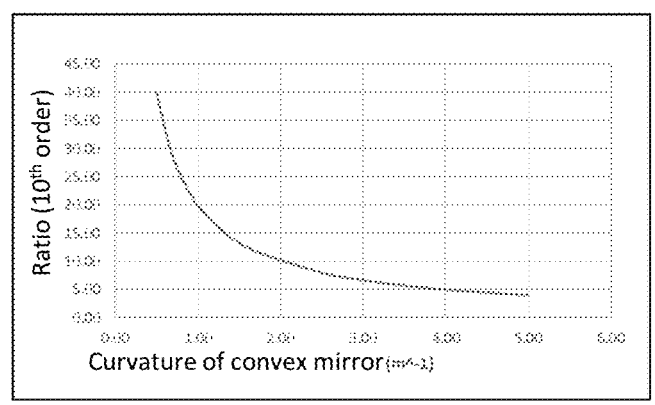

FIGS. 9A-9C illustrate a way to determine an acceptable range of bending for the reflected images. Referring to FIG. 9A, R is the radius of the convex bottom mirror 113. R'10 is a radius of a 10th order reflected image. Referring to FIGS. 9A and 9B, L is distance between two edges of the light source 125 and also a horizontal width of the 10th order reflected image. h is a vertical height of the 10th order reflected image and can be calculated from $$h \approx 10 \cdot \left(\sqrt{R^2 - L^2/4} - \sqrt{R^2 - L^2/2}\right).$$

Perception of a curvature of the reflected image by human eyes is largely determined by $Ratio_{10}=L/h$. As shown in FIG. 9C, the higher the ratio is, the smaller the bending appears.

FIGS. 10A-10E illustrate 3D simulated infinity mirror devices with convex bottom mirrors of different curvatures. The simulated infinity mirrors all have a square edged light source of 40 mm in side length (L). A top view is on the left-hand side; and an angled view is on the right-hand side. For the top view, viewing location is set at about 50 mm perpendicular to a center of a front mirror. For the angled view, the simulated infinity mirror devices rotate θx=10°, θy=35°, θz=10°. The top view serves to illustrate the separation of the reflected images; while the angled view serves to illustrate the bending of the reflected images.

Figure 10A:
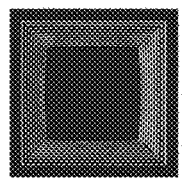
FIGS. 10A-10E illustrate 3D simulated infinity mirrors with convex bottom mirrors of different curvatures.
Figure 10A:
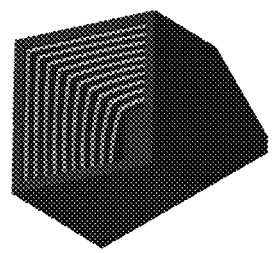
Figure 10B:
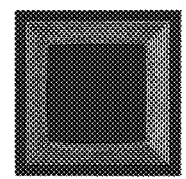
Figure 10B:
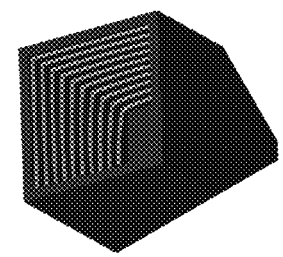
Figure 10C:
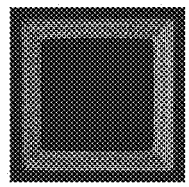
Figure 10C:
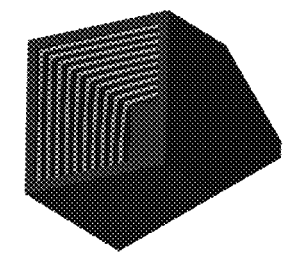
Figure 10D:
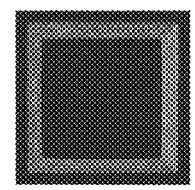
Figure 10D:
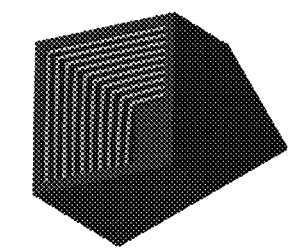
Figure 10E:
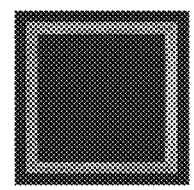
Figure 10E:
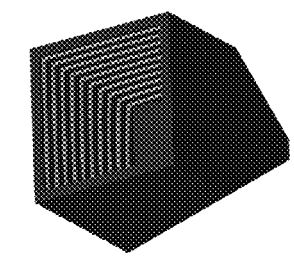

FIG. 10A shows a simulated infinity mirrors with a convex bottom mirror that has a radius of 400 mm. Although the reflected images are well separated from the top view, the reflected images show bending from the angled view. FIG. 10B shows a simulation with a convex bottom mirror that has a radius of 600 mm. The separation becomes less, and so is the bending. FIGS. 10C-10E shows simulation with a convex bottom mirror that has a radius of 800 mm, 1000 mm, and 1200 mm, respectively. When balancing the need for reflected image separation and the need to less bending, radius between 600 mm to 1200 mm are found to be acceptable for L less than 50 mm.

Figure 11A:
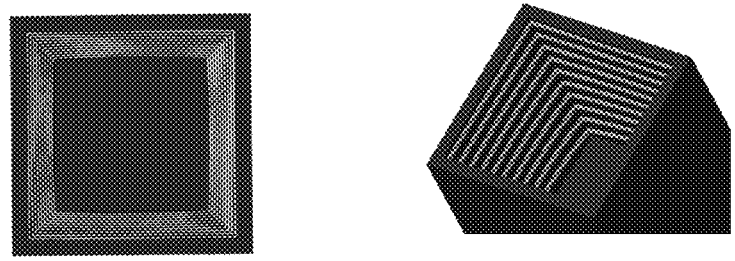
FIGS. 11A and 11B illustrate a comparison between a 3D simulation and an actual infinity mirror device of the same dimension.
Figure 11B:
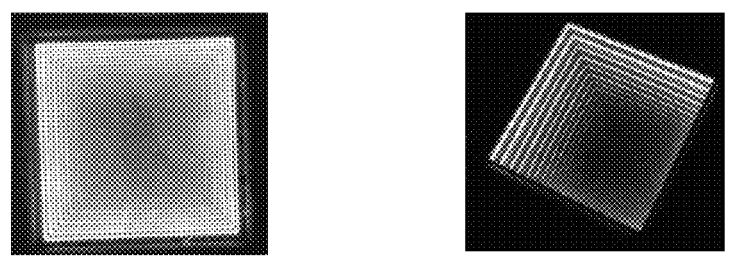

FIGS. 11A and 11B illustrate a comparison between a 3D simulation and an actual infinity mirror device of the same dimension. FIG. 11A shows a simulated top view and an angled view. FIG. 11B shows an actual device's top view and an angled view. The simulated and the actual infinity mirror device look substantially the same.

Although square infinity mirror devices are so far discussed, in other embodiments, the convex bottom mirror of the present disclosure can be used in a circle, diamond shaped or other types of infinity mirror devices.

Figure 12A:
FIGS. 12A and 12B illustrate a first exemplary method for making the convex bottom mirror.
Figure 12B:
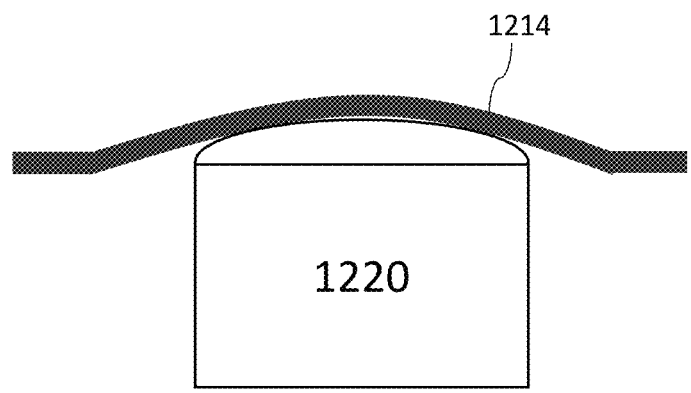

FIGS. 12A and 12B illustrate a first exemplary method for making the convex bottom mirror. The first exemplary method begins with a flat reflective metal plate 1204 as shown in FIG. 12A. Referring to FIG. 12B, the metal plate 1204 is stamped into convex mirror with a desired curvature determined by a stamping die 1220.

Figure 13A:
FIGS. 13A and 13B illustrate a second exemplary method for making the convex bottom mirror.
Figure 13B:

FIGS. 13A and 13B illustrate a second exemplary method for making the convex bottom mirror. The second exemplary method begins with a molded plastic part 1302 with a desired convex surface contour as shown in FIG. 13A. The molded plastic part 1302 is then sputtered with a reflective metal to form a reflective surface 1314 which takes the convex contour of the plastic part 1302.

Figure 14A:
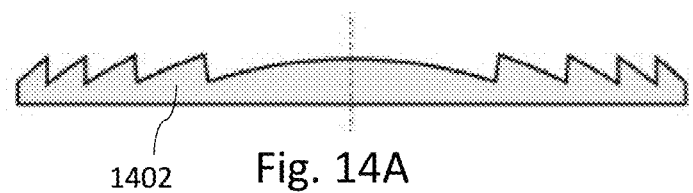
FIGS. 14A and 14B illustrate a third exemplary method for making the convex bottom mirror.
Figure 14B:
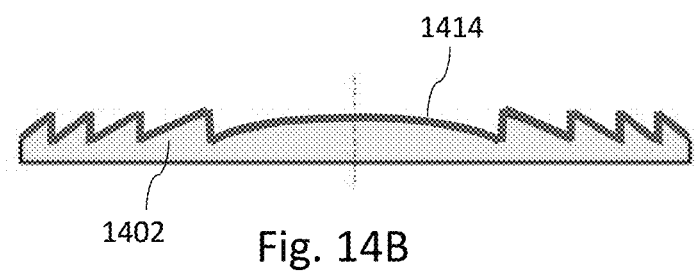

FIGS. 14A and 14B illustrate a third exemplary method for making the convex bottom mirror. The third exemplary method similarly begins with a molded plastic part 1402 which instead has a Fresnel lens structure. The Fresnel lens structure is much more compact than that of its equivalent plano-convex lens structure. As shown in FIG. 4B, a layer of reflective metal 1414 is then sputtered on the plastic part 1402 to form a Fresnel convex mirror surface. A disadvantage, however, is when an overall size of the plastic part 1402 is small, the sputtered metal may fill up the valleys of the Fresnel lens structure.

The partially transparent front mirror 102 is exemplarily made of a transparent plastic material having a partially reflective coating. As described earlier, the partially transparent front mirror 102 can also has a convex reflective surface similar to the convex bottom mirror 113.

Figure 15A:
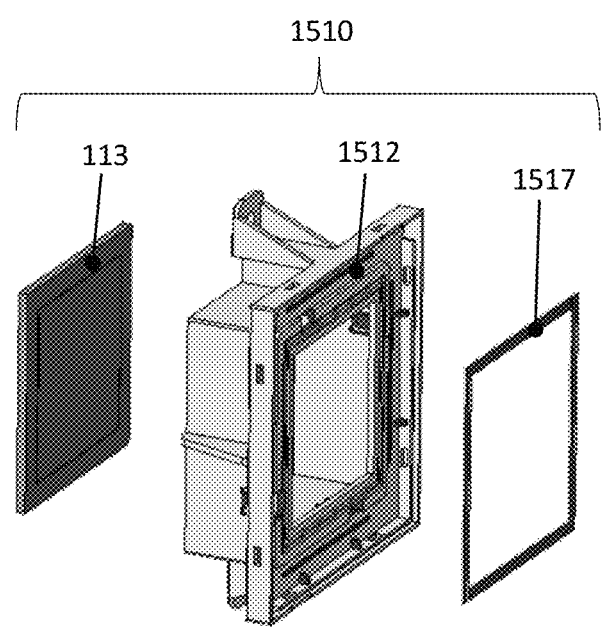
FIGS. 15A-15C illustrate an infinity mirror device assembly according to an embodiment of the present disclosure.
Figure 15B:
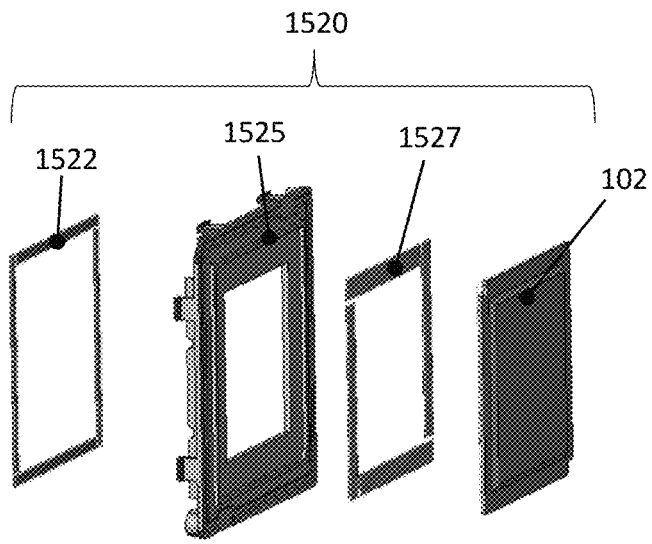
Figure 15C:
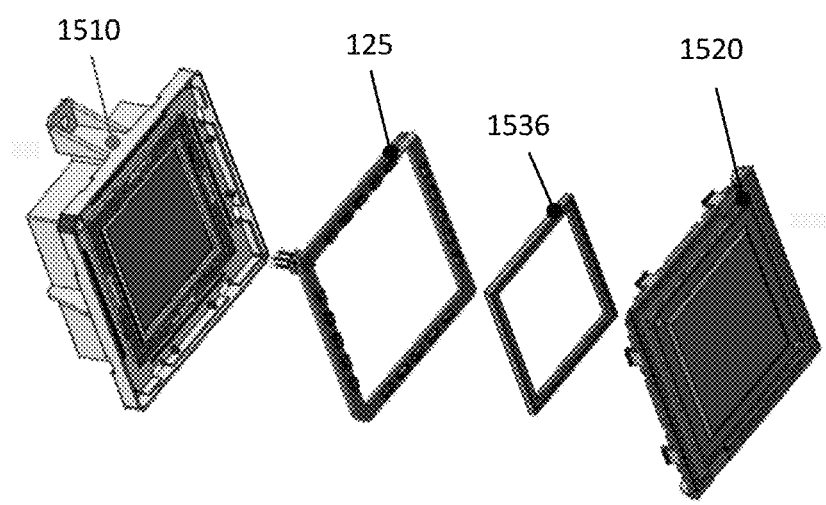

FIGS. 15A-15C illustrate an infinity mirror device assembly according to an embodiment of the present disclosure.

FIG. 15A shows a rear frame sub-assembly 1510 which includes a convex bottom mirror 113, a rear frame 1512 and a first reflective sheet 1517. The convex bottom mirror 113 is secured at a bottom of the rear frame 1512. The first reflective sheet 1517 is disposed on side walls of the rear frame 1512 for reflecting light into the internal space of the rear frame 1512.

FIG. 15B shows a front bezel sub-assembly 1520 which includes a second reflective sheet 1522, a front bezel 1525, a double-sided tape 1527 and a partially transparent front mirror 102. The second reflective sheet 1522 is disposed on the side walls of the front bezel 1525 for reflecting light into the internal space of the front bezel 1525. The double-sided tape 1527 glues the front mirror 102 to the front bezel 1525. In an embodiment, the partially transparent front mirror 102 has a 10% penetration rate.

FIG. 15C shows a finishing assembly of the infinity mirror device of the present disclose. The finishing assembly includes the rear frame sub-assembly 1510, a light source 125, a light dispersion lens 1536 and the front bezel sub-assembly 1520. The light source 125 is made of a plurality of LED light emitters mounted on a square ring of printed circuit board assembly (PCBA). The plurality of LED light emitters can be of a uniform white color or any other color. Alternatively, it can have multiple colors strategically arranged on the PCBA. The PCBA is connected to a power source and may include a control circuit to control the lighting pattern and timing of the plurality of LED light emitters. For example, the plurality of LED light emitters lights up on one edge of the square ring PCBA at a time or blink periodically.

In other embodiments, the light source 125 is a spot light and placed in a center of the infinity mirror device between the front and bottom mirrors. An object in place of the light source 125 may also be place in the center of the infinity mirror device between the front and bottom mirrors.

Referring to FIG. 15C again, the light dispersion lens 1536 is made of a square-ring transparent material doped with light-scattering particulars. The transparent material, for example, is an acrylic. The light dispersion lens 1536 is smaller in dimension than the light source 125, and disposed in the same plane and in the internal space of the light source 125. Both the light source 125 and the light dispersion lens 1536 are disposed in the rear frame sub-assembly 1510 which is covered by the front bezel sub-assembly 1520 in the finished assembly.

Although the disclosure is illustrated and described herein as embodied in one or more specific examples, it is nevertheless not intended to be limited to the details shown, since various modifications and structural changes may be made therein without departing from the spirit of the disclosure and within the scope and range of equivalents of the claims. Accordingly, it is appropriate that the appended claims be construed broadly and, in a manner, consistent with the scope of the disclosure, as set forth in the following claims.

What is claimed is:

1. An infinity mirror device, comprising:
   a first mirror having a convex first reflective surface;
   a second mirror having a second reflective surface facing the first reflective surface,
   wherein the first and second mirror are spaced apart by a predetermined distance;
   a light source disposed in a space between the first and the second mirror; and
   an elongated dispersion lens disposed in front of the light source.

2. The infinity mirror device of claim 1, wherein the first reflective surface has a Fresnel lens structure.

3. The infinity mirror device of claim 1, wherein the first mirror is partially transparent.

4. The infinity mirror device of claim 1, wherein the second reflective surface is flat.

5. The infinity mirror device of claim 1, wherein the second reflective surface is convex.

6. The infinity mirror device of claim 1, wherein the second reflective surface is partially transparent.

7. The infinity mirror device of claim 1, wherein the light source is disposed at a periphery of either the first or the second mirror.

8. The infinity mirror device of claim 1, wherein the light source includes a plurality of LED light emitters mounted on a printed circuit board.

9. The infinity mirror device of claim 1 further comprising a reflective member disposed in the vicinity of the light source for reflecting light generated by the light source toward a center of a space between the first and the second mirror.

10. The infinity mirror device of claim 1, wherein a radius of the convex first reflective surface of less than 50 mm wide is between 600 mm and 1200 mm.

11. The infinity mirror device of claim 1, wherein the second mirror has the shape selected from square, circle and diamond.

12. The infinity mirror device of claim 1, wherein the first mirror is made of a stamped metal sheet.

13. The infinity mirror device of claim 1, wherein the first mirror is made of a molded plastic sputtered with a metal layer to form the first reflective surface.

14. An infinity mirror device, comprising:
a first mirror having a convex first reflective surface;
a partially transparent second mirror having a second reflective surface facing the first reflective surface, wherein the first and second mirror are spaced apart by a predetermined distance; and
a light source disposed in a space between the first and the second mirror, the light source including a plurality of LED light emitters mounted on a printed circuit board.

15. The infinity mirror device of claim 14, further comprising a dispersion lens disposed in front of the plurality of LED light emitters.

16. The infinity mirror device of claim 14 further comprising a reflective member disposed in the vicinity of the light source for reflecting light generated by the light source toward a center of the space between the first and the second mirror.

17. An infinity mirror device, comprising:
a first mirror having a convex first reflective surface secured to a bottom of a rear frame with a front opening, the convex first reflective surface facing the front opening of the rear frame;
a partially transparent second mirror secured to a front bezel fastened to the front opening of the rear frame, wherein the second mirror is kept a predetermined distance from the first mirror, and the second mirror has a second reflective surface facing the convex first reflective surface;
a light source disposed next to an internal side wall of the rear frame in a space between the first and the second mirror; and
an elongated dispersion lens disposed in front of the light source.

18. The infinity mirror device of claim 17, wherein the light source includes a plurality of LED light emitters mounted on a printed circuit board.

19. The infinity mirror device of claim 17 further comprising a reflective member disposed in the vicinity of the light source for reflecting light generated by the light source toward a center of the space between the first and the second mirror.

20. The infinity mirror device of claim 17, wherein the second reflective surface is convex toward the first reflective surface.

* * * * *